United States Patent [19]
Kiri et al.

[11] Patent Number: 5,350,960
[45] Date of Patent: Sep. 27, 1994

[54] ELECTRIC MOTOR WITH BOBBIN COLUMNS TO PREVENT BULGING COILS

[75] Inventors: Shuichi Kiri; Kouki Kieda; Shunichi Kachi; Yukinori Takekoshi; Yasunari Takada, all if Gifu; Yuji Nakahara; Tomoyuki Nishinaka, both of Tokyo, all of Japan

[73] Assignee: Mitsubishi Denki Kabushiki Kaisha, Tokyo, Japan

[21] Appl. No.: 18,410

[22] Filed: Feb. 17, 1993

[30] Foreign Application Priority Data

Feb. 17, 1992 [JP] Japan ................................. 4-029702
Nov. 16, 1992 [JP] Japan ................................. 4-328967

[51] Int. Cl.⁵ ............................................ H02K 11/00
[52] U.S. Cl. ...................................... 310/194; 310/71
[58] Field of Search ................ 310/194, 71, 234, 235, 310/42, 45

[56] References Cited

U.S. PATENT DOCUMENTS

| | | |
|---|---|---|
| 3,780,323 | 12/1973 | Swain ................... 310/194 |
| 5,097,168 | 3/1992 | Takekoshi et al. . |
| 5,134,327 | 7/1992 | Sumi et al. . |
| 5,187,858 | 2/1993 | Murakoshi et al. ............... 310/71 X |

FOREIGN PATENT DOCUMENTS

| | | |
|---|---|---|
| 56-141576 | 10/1981 | Japan . |
| 57-115545 | 7/1982 | Japan . |
| 59-32980 | 8/1984 | Japan . |
| 64-34155 | 2/1989 | Japan . |
| 1144336 | 6/1989 | Japan . |
| 1409721 | 9/1972 | United Kingdom . |

Primary Examiner—Steven L. Stephan
Assistant Examiner—E. To

[57] ABSTRACT

An electric motor in which an inner ring magnetic pole portion (10) consisting of magnetic pole pieces (7) is fitted into an outer ring yoke portion (5) to form stator core (6); an insulating resin is shaped and fixed, the insulating resin includes coil guards (16) which protrude on one end face of the inner ring magnetic pole portion (10); grooves for inserting insulating wedges (31) are formed on the side wall of the coil guards (16); a rotor (17) is inserted into the inner ring magnetic pole portion (10); an insulating cover (19) which consists of pins (25) and bobbin columns (20) including outer poles (24) and inner poles (23) is put on the rotor (17); coils (26) are wound in the space formed between the inner poles (23) and the center of the inner ring magnetic pole portion (10).

18 Claims, 13 Drawing Sheets

FIG. 19A
FIG. 19B
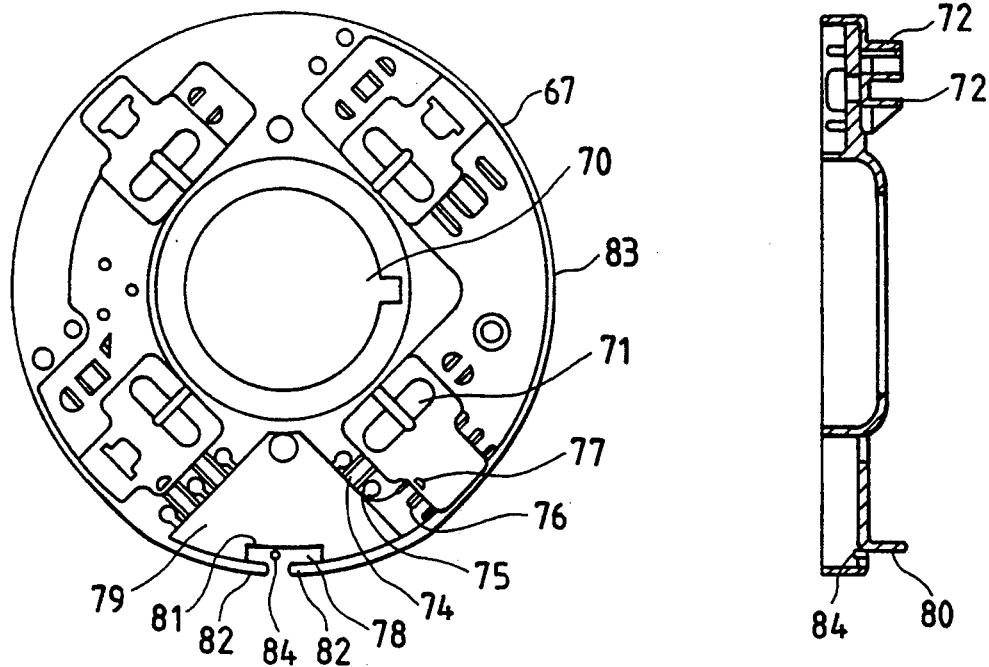
FIG. 20A
FIG. 20B
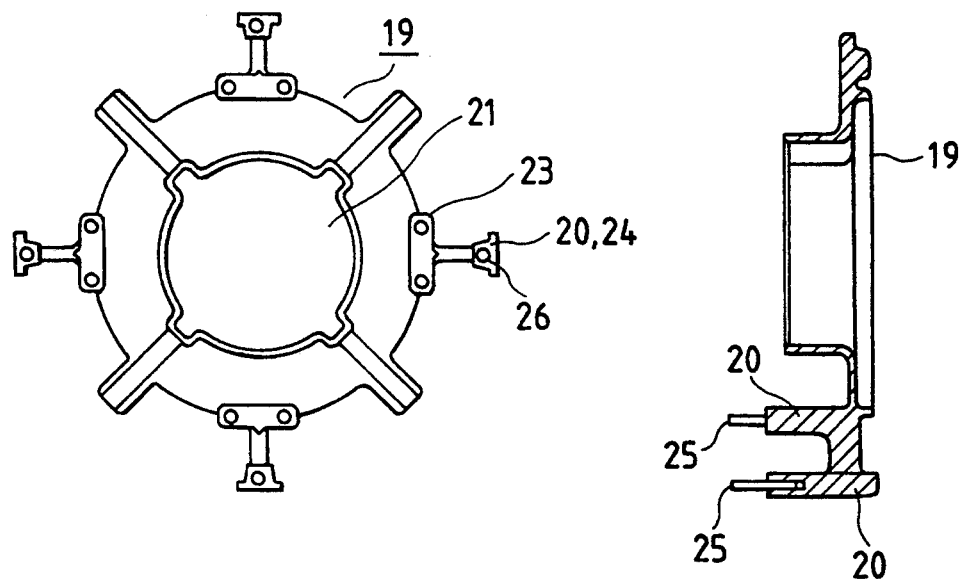

ELECTRIC MOTOR WITH BOBBIN COLUMNS TO PREVENT BULGING COILS

BACKGROUND OF THE INVENTION

1. Field of Invention

The present invention relates to an electric motor in which an outer ring yoke portion and an inner ring magnetic pole portion are separately formed, a rotor is inserted into the inner ring magnetic pole portion, and coils are wound on the inner ring magnetic pole portion.

2. Description of Prior Art

FIGS. 28 and 29 show a conventional electric motor. FIG. 28 is a plan view showing a stator of the motor, and FIG. 29 is a perspective view of the motor. In a conventional motor as shown in FIG. 28, slots 1 are formed at an inner circle of an iron plate 2. A plurality of such iron plates 2 are stacked so as to form a stator 3. Coils 4 are wound between the slots 1 of the stator 3 by the insert method. A U-shaped insulating wedge is disposed in each of the slots 1 (for example, see Unexamined Japanese Utility Model Publication (Kokai) Sho-56-141576).

As shown in FIG. 29, after leads 4a are connected to respective terminals of the coils 4 on the stator 3, the stator 3 is located in a housing (not shown), and the leads 4a are connected to a power supply cord (not shown) (for example, see Examined Japanese Patent Publication (Kokoku) Sho-59-32980).

FIGS. 30 and 31 show another conventional electric motor. FIG. 30 is a perspective view showing an outer ring yoke portion of the motor, and FIG. 31 is a perspective view showing a terminal cover of the motor of FIG. 30. In a conventional motor as shown in FIG. 30, a terminal holder 67 is mounted on an outer ring yoke portion 5. Terminals of coils 26 are connected to terminals 68 on the terminal holder 67. Thereafter, a terminal cover 69 on which leads 47 are mounted is attached to the terminal holder 67, so that the terminals 68 and the leads 47 are connected to each other (for example, see Unexamined Japanese Utility Model Publication Sho-57-115545).

In the above-mentioned conventional motor shown in FIGS. 28 and 29, the coils 4 are inserted into the slots 1 by the insert method. Therefore, it is necessary to provide the coils 4 with an extra length (slackening) in addition to the length needed for winding the coils 4 between the slots 1. As a result, the necessary length of the coils 4 should be made larger, and hence the amount of conductors for the coils becomes large, which deteriorates the characteristics. In some cases, the coils 4 may be bulged out of the slots 1, or ends of the coils 4 may be unbraided. In such cases, it takes a long time to perform working processes such as shaping, coil binding, and varnishing. Moreover, such working processes are difficult to be mechanized.

Moreover, the connections between the coils 4 and the leads 4a, and thermal fuses (not shown) and the coils 4 are manually performed by soldering or the like which requires skill. Therefore, there exists another problem in that the connecting work requires man power and takes a long time.

When the U-shaped insulating wedges are to be inserted into the slots 1, the shape of the wedges makes the insertion difficult. Because of this poor workability, it is difficult to automatically perform the insertion. Moreover, in some cases, the coils 4 may be bulged out from the gap formed between the wedge and the stator 3. Since it is difficult to automatically detect this failure, there arises a problem in that it is necessary to perform the detection by visual observation.

In another conventional motor shown in FIGS. 30 and 31, the terminal holder 67 and the terminal cover 69 are separately formed, thereby causing a poor working efficiency in assembling the motor. Therefore, there is a problem in that the motor cannot be automatically assembled.

SUMMARY OF THE INVENTION

The present invention solves the above problems. The objective of the present invention is to provide an electric motor in which the coil length is reduced and hence the required amount of conductors for coils is also reduced, whereby the motor has improved characteristics. Moreover, in the motor, coils are not bulged out of slots, and the coil ends will not be unbraided, whereby the succeeding working processes can be readily and mechanically performed. Furthermore, the processes of connecting the coils with the leads, and the coils with a thermal fuse can be mechanized.

Another objective of the present invention is to provide an electric motor in which insulating wedges can easily be inserted into the slots and the insertion process can be automatically performed.

A further objective of the present invention is to provide an electric motor in which the processes of connecting the coils with the leads, and the coils with a thermal fuse can be mechanized.

A still further objective of the present invention is to provide an electric motor in which a terminal holder and a terminal cover are integrally formed and which therefore can be automatically assembled with improved work efficiency.

The electric motor of the first aspect of the invention comprises: an outer ring yoke portion which forms an outer ring; a stator core in which an inner ring magnetic pole portion is fitted in the outer ring yoke portion, the inner ring magnetic pole portion having slots and including a plurality of magnetic pole pieces; an insulating portion which covers the inner ring magnetic pole portion of the stator core; a funnel-shaped insulating resin which is formed integrally with the insulating portion and covers one end face of the inner ring magnetic pole portion, the insulating resin including a first through hole for a rotational shaft, the first through hole being communicating with the center of the inner ring magnetic pole portion; coil guards which are protuberantly formed on the magnetic pole pieces, the coil guards being formed integrally with the insulating resin; a rotor which is inserted into the inner ring magnetic pole portion; a funnel-shaped insulating cover including a second through hole for the rotational shaft, the insulating cover covering the rotor, the second through hole being communicated with the first through hole; bobbin columns having pins which are protuberantly formed on an end face of the insulating cover, the bobbin columns being located between the coil guard and the center of the inner ring magnetic pole portion; and coils which are wound in a space formed between the bobbin columns and the center of the inner ring magnetic pole portion, the coils having terminals which are connected to the pins.

In the electric motor of the second aspect of the invention, the bobbin columns are located within the inside diameter of the inner ring magnetic pole portion.

In the electric motor of the third aspect of the invention, supporting members for the rotational shaft are disposed in the insulating resin and the insulating cover.

In the electric motor of the fourth aspect of the invention, a common wire of coils is connected to a plurality of pins, and a wiring board through which the pins pass is mounted on the stator core, the wiring board being provided with grooves for allowing the plurality of pins to be connected to an identical conductor of power supply leads.

In the electric motor of the fifth aspect of the invention, a covering of a power supply lead is stripped off, and the power supply lead is located in the groove while the forward end of the power supply lead remains covered.

In the electric motor of the sixth aspect of the invention, a housing for accommodating the stator core is constituted by a frame and a bracket which are joined with each other by opposite joining edge portions, the joining edge portion of the bracket having a substantially U-shaped cut-out portion through which the power supply leads are inserted, the cut-out portion having a narrow entrance and a wide inner portion, and a code bush is fitted to the cut-out portion.

In the electric motor of the seventh aspect of the invention, the power supply leads run through an insulating tube, the insulating tube having a curled portion at an end portion thereof, the curled portion having a larger size than that of the cut-out portion.

In the electric motor of the eighth aspect of the invention, the coil guards are formed into different shapes, grooves are formed at a side wall of the coil guards, and insulating wedges are inserted.

In the electric motor of the ninth aspect of the invention, coil guards have an inclined guide for an insulating wedge and a protrudent fixing portion for the insulating wedge.

In the electric motor of the tenth aspect of the invention, each of the bobbin columns on the insulating cover is constituted by an inner pole with a plurality of pins and an outer pole with a single pin, the inner pole being located separately from each other on a circle which has the center in the inner ring magnetic pole portion, the outer pole being located separately from each other on a concentrical circle greater than the circle.

In the electric motor of the eleventh aspect of the invention, a plurality of coils which produce different phases are connected to pins, respectively, and a wiring board through which the pins pass is mounted on the stator core, the wiring board being provided with grooves for allowing the plurality of pins to be connected to an identical conductor of power supply leads.

In the electric motor of the twelfth aspect of the invention, a wiring board comprises: a disk-like wiring board body; an opening formed at the center of the wiring board body; pin connecting portions disposed around the opening and at positions quartering the wiring board body, the pin connecting portions having a plurality of pin hole rows; lead connecting portions which are perpendicular to the pin connecting portions; and a lead introducing port disposed between the pin connecting portions, the wiring board further comprising a cut-out portion formed by cutting the side wall of the wiring board in the lead introducing port, and a wall elongating along the cut-out portion.

The electric motor of the thirteenth aspect of the invention comprises: an outer ring yoke portion which forms an outer ring; a stator core in which an inner ring magnetic pole portion is fitted in the outer ring yoke portion, the inner ring magnetic pole portion having slots and consisting of a plurality of magnetic pole pieces; an insulating portion which covers the inner ring magnetic pole portion of the stator core; a funnel-shaped insulating resin which is formed integrally with the insulating portion and covers one end face of the inner ring magnetic pole portion, the insulating resin including a first through hole for a rotational shaft having continuity with the center of the inner ring magnetic pole portion; bobbin columns having pins which are protuberantly formed on the magnetic pole pieces, the bobbin columns being formed integrally with the insulating resin; a stator in which a funnel-shaped insulating cover including a second through hole for the rotational shaft is disposed on the other end face of the inner ring magnetic pole portion, and coils are wounded between the slots, terminals of the coils being twined around the pins, the second through being communicated with the first through hole when the rotor is located in the inner ring magnetic pole portion; a terminal holder having an opening at the center, the terminal holder being provided with electronic devices to be connected to the pins of the bobbin columns; guide grooves for guiding leads to pin holes which are formed at positions quartering the terminal holder; and deformable protruding portions provided for sandwiching the guide grooves.

In the electric motor of the fourteenth aspect of the invention, detachable putty blocking pins are disposed in the guide grooves.

In the electric motor of the fifteenth aspect of the invention, cylindrical guards are disposed on the back face of the pin holes.

In the electric motor of the sixteenth aspect of the invention, a protruding piece which opposes the insulating cover is disposed around the opening.

In the electric motor of the seventeenth aspect of the invention, a lead introducing port is formed in the periphery of the terminal holder, and a downward skirt portion is continuously formed from the lead introducing port.

According to the first aspect of the invention, the coils can be disposed inside the stator core.

According to the second aspect of the invention, the coils can be disposed on the inside diameter of the inner ring magnetic pole portion.

According to the third aspect of the invention, the rotational shaft can be made short.

According to the fourth aspect of the invention, a plurality of common wires can be commonly connected by a single process to an identical conductor of the power supply leads.

According to the fifth aspect of the invention, the power supply lead can be located in the groove using the cover-remaining portion.

According to the sixth aspect of the invention, the cord bush can be fixed to the cut-out portion in the entrance region.

According to the seventh aspect of the invention, the insulating tube can be held by the curled portion in the bracket, even when the insulating tube is externally pulled.

According to the eighth aspect of the invention, the insulating wedges can be inserted between the coil guards through grooves.

According to the ninth aspect of the invention, the insulating wedge can be inserted between the coil guards along the guide for the insulating wedge and is positioned and fixed by the fixing portion for the insulating wedge.

According to the tenth aspect of the invention, the pins can be arranged in a triangular shape.

According to the eleventh aspect of the invention, a plurality of coils can be commonly connected by a single process to an identical conductor of the power supply leads through the pins.

According to the twelfth aspect of the invention, the leads can be pressed by the cut-out portion and the wall portion.

According to the thirteenth aspect of the invention, after the lead is inserted into the guide groove, the protruding portions are bent toward the guide groove, so that the lead can be held and fixed.

According to the fourteenth aspect of the invention, the flow of the insulating resin can be blocked by the putty blocking pins.

According to the fifteenth aspect of the invention, the flow of the insulating resin can be blocked by the cylindrical guards.

According to the sixteenth aspect of the invention, the protruding piece and the insulating cover constitute a wall.

According to the seventeenth aspect of the invention, the leads can be insulated by the skirt portion.

BRIEF DESCRIPTION OF THE DRAWINGS

FIG. 18A is a plan view of a lead introducing port, and FIG. 18B is a sectional view of the lead introducing port.

FIGS. 19A and 19B show a terminal holder of the electric motor of the another embodiment of the invention, and FIG. 19A is a plan view and FIG. 19B is a side elevation view.

FIGS. 20A and 20B show an insulating cover of the motor of FIG. 19, and FIG. 20A is a plan view and FIG. 20B is a side elevation view.

DETAILED DESCRIPTION OF PREFERRED EMBODIMENTS

Figure 1:
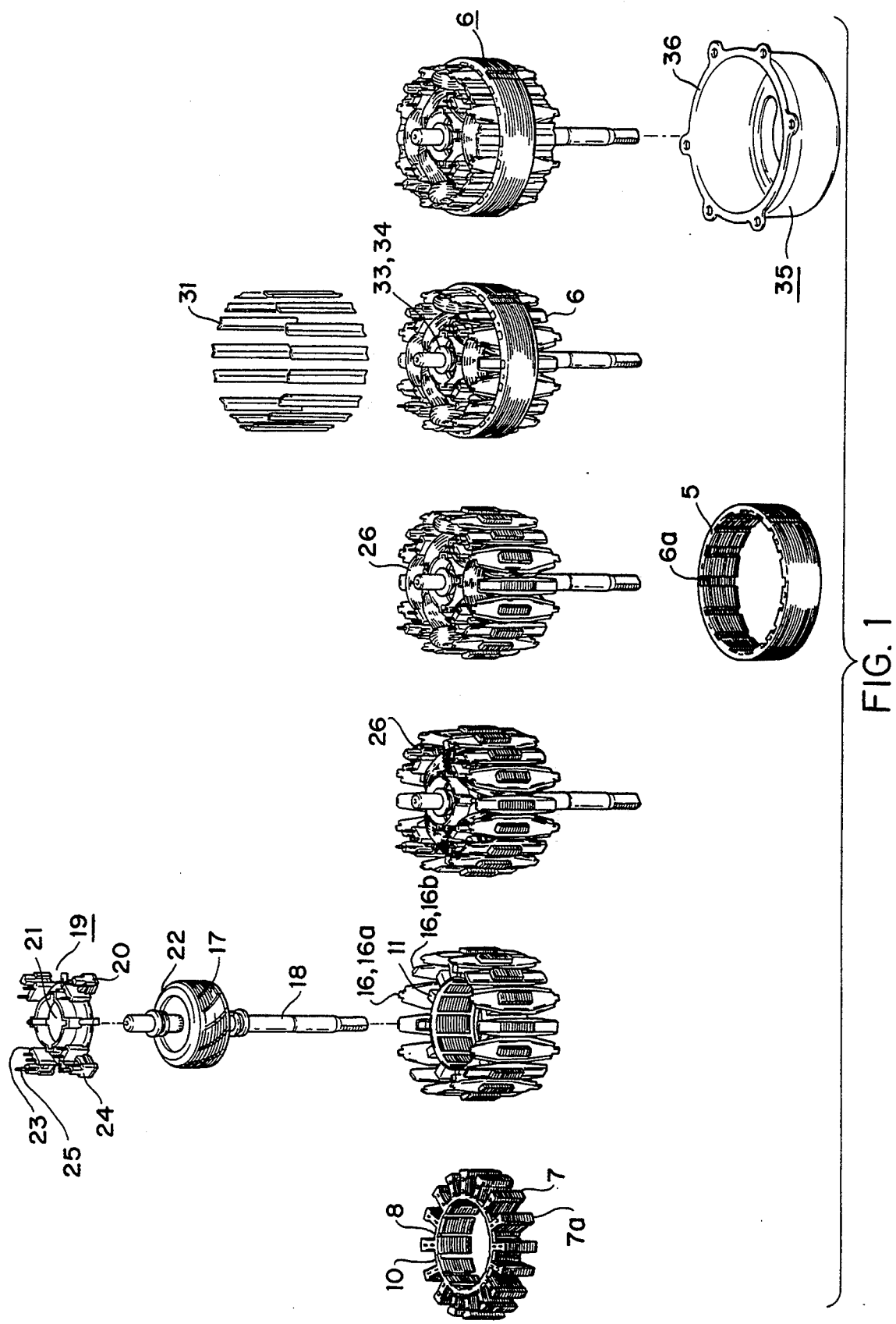
FIG. 1 is a perspective view showing the assembly of an embodiment of the invention.
Figure 2:
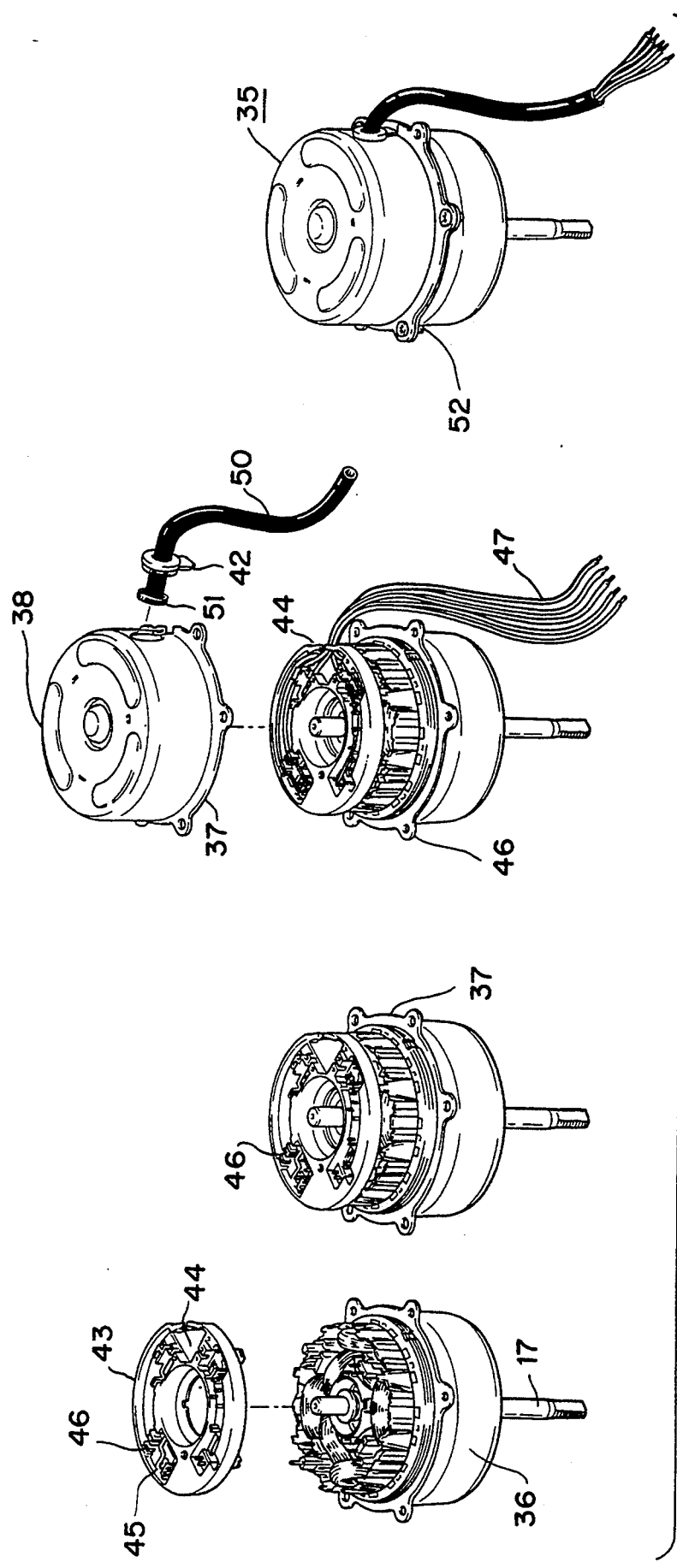
FIG. 2 is a perspective view showing the assembly of the electric motor of FIG. 1 to which a housing is additionally provided.
Figure 3:
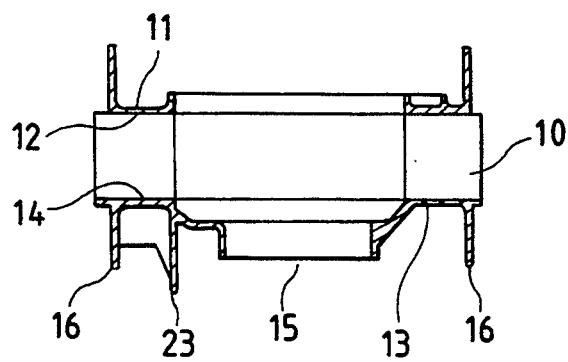
FIG. 3 is a sectional view of the stator core shown in FIG. 1.
Figure 5:
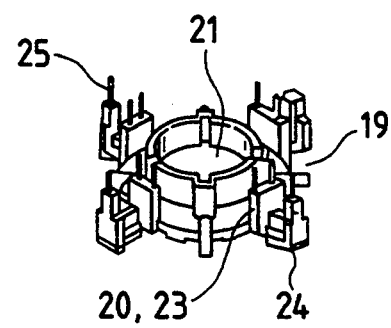
FIG. 5 is a perspective view of the insulating cover shown in FIG. 1.
Figure 4:
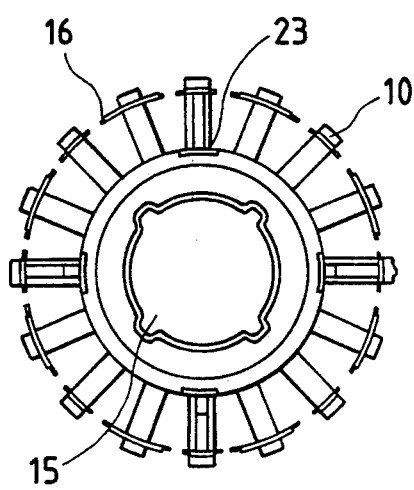
FIG. 4 is a bottom view of the stator core shown in FIG. 1.

FIGS. 1 to 18 show an embodiment of the invention. In the figures, 5 designates an outer ring yoke portion which constitutes the outer ring portion of a stator core 6. The outer ring yoke portion 5 is formed as follows: an electric steel sheet wound in a hoop is punched by a high speed automatic press (not shown) in the shapes of a stator and a rotor core which will be described later, and then stacked in a predetermined thickness to be caulked. The reference numeral 6a designates fitting recesses which are formed on the inner wall of the outer ring yoke portion 5, and 7 designates a plurality of magnetic pole pieces which protrude so as to form slots 8 directed from the inner periphery of the outer ring yoke portion 5 toward the center. The forward ends 7a of the magnetic pole pieces are respectively fitted in the fitting recesses 6a of the outer ring yoke portion 5. The magnetic pole pieces 7 are formed by stacking core plates of the thickness of, for example, 0.35 to 0.5 mm. The magnetic pole pieces 7 are arranged at equal intervals to constitute an inner ring magnetic pole portion 10.

The reference numeral 11 designates an insulating portion which is produced by, for example, injection molding so as to cover the inner ring magnetic pole portion 10. The insulating portion 11 is formed on and fixed to the slots 8 and the end face 12 of the inner ring magnetic pole portion 10. The magnetic pole pieces 7 which have been formed by the stacking are respectively held by provisional insertion tools that are arranged at the same pitch as injection molds, and then transferred to the injection molds to be subjected therein to the one-piece molding. Since the magnetic pole pieces are separated from each other, the characteristics of the motor are improved.

The reference numeral 13 designates insulating resin which is formed on and fixed to one end face 14 of the inner ring magnetic pole portion 10. The insulating resin is formed integrally with the insulating portion 11 into a funnel shape, and has at its forward end a first circular through hole 15 for a rotational shaft.

Figure 12:
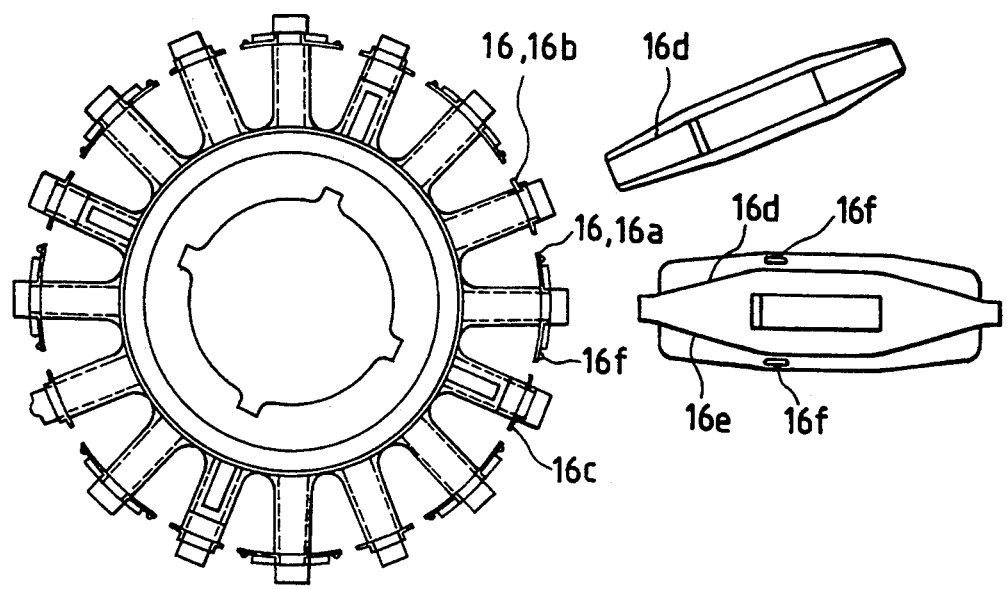
FIG. 12 is a plan view and partial sectional view of the stator core shown in FIG. 1.
Figure 13:
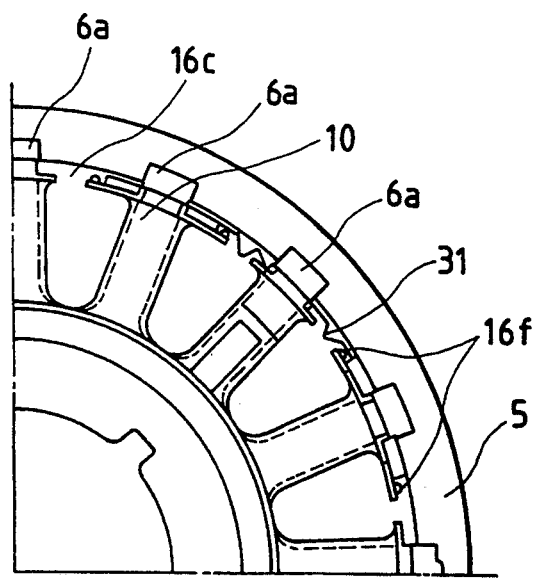
FIG. 13 partial plan view of the stator core shown in FIG. 1 which corresponds to FIG. 12 and shows the state of inserting insulating wedges.

The reference numeral 16 designates coil guards which protrude from the peripheral edge of the inner ring magnetic pole portion 10 and are formed integrally with the rotational shaft through hole 15. The coil guards 16 are located at the outer periphery of the magnetic pole pieces 7, and function as winding guides. The coil guards 16 have different shapes, and are classified into two types as shown in FIG. 12: first coil guards 16a having a larger width; and second coil guards 16b having a smaller width. The reference numeral 16c designates grooves which are formed on the side wall of the coil guards 16 and into which insulating wedges (described later) are inserted. The insulating wedges will be described later. The reference numeral 16d designates insulating wedge-insertion guides which are formed integrally with the grooves 16c and have a slope that descends to an introducing port 16e. The reference numeral 16f designates insulating wedge-fixing portions which protrude from the rear end of the insulating wedge-insertion guides 16d, and which cooperate with the outer ring yoke portion 5 to press and fix the insulating wedges when the inner ring magnetic pole portion 10 is assembled with the outer ring yoke portion 5 by pressingly inserting it thereinto (see FIG. 13). In this embodiment, coils are wound so as to extend from one of the second narrow coil guards 16b to another one of the second narrow coil guards 16b, and prevented by the first wide coil guards 16a from being unbraided.

The reference numeral 17 designates a rotor which is disposed in the inner ring magnetic pole portion 10 and through which a rotational shaft 18 passes at the center portion. The reference numeral 19 designates an insulating cover which has a funnel-like shape. A plurality of bobbin columns 20 which independently function as winding guides are formed in the periphery of the insulating cover. The insulating cover 19 has a second circular through hole 21 for the rotational shaft which hole is communicated with the inner ring magnetic pole portion 10 and the first through hole 15 for the rotational shaft. The insulating cover 19 is detachably attached to the end face of the inner ring magnetic pole portion 10 so that an end ring 22 which is a conductor of the rotor 17 is insulated from the exterior.

Figure 14A:
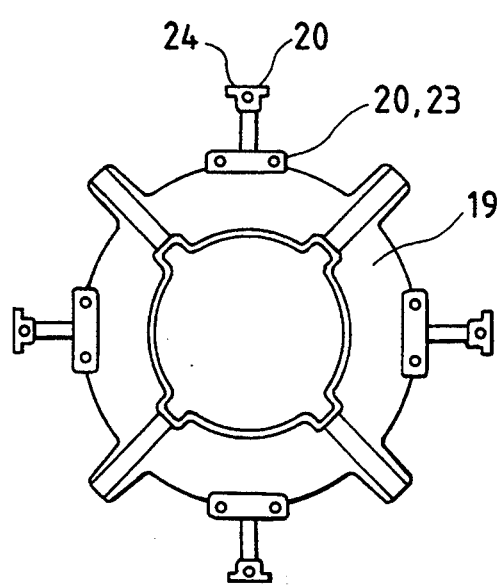
FIG. 14 a is a plan view of the insulating cover shown in FIG. 1.
FIG. 14B is a plan view of a bobbin column.
Figure 14B:
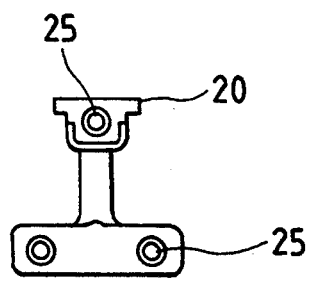

As shown in FIGS. 14A and 14B, the bobbin columns 20 are arranged at positions quartering the inner ring magnetic pole portion 10, and disposed on the circumferences of two different circles with respect to the center of the inner ring magnetic pole portion 10. The bobbin columns 20 include inner poles 23 which are located in the center side of the inner ring magnetic pole portion 10, and outer poles 24 which are located outside the inner ring magnetic pole portion 10 so as to respectively oppose the inner poles. The bobbin columns 20 are arranged within the inner diameter of the inner ring magnetic pole portion 10 in such a manner that they are closer to the center of the inner ring magnetic pole portion 10 than the coil guards 16 (see FIG. 6). The inner poles 23 are disposed so as to be closer to the center of the inner ring magnetic pole portion 10 than the coil guards 16 which are formed integrally with the inner ring magnetic pole portion 10, and to be on a substantially straight line which elongates along the axial direction and passes the inner poles 23 formed in the insulating resin 13. The inner poles may be arranged in a slightly misaligned manner. The reference numeral 25 designates pin bodies which are inserted into the forward end of the bobbin columns 20. More specifically, two pin bodies are attached at a predetermined space to each of the inner poles 23, and one pin body is attached to each of the outer poles. To the pin bodies, connected are end portions of coils and power supply leads which will be described later. The reference numeral 26 designates the coils including, for example, a magnet wire which is coated with an autohesion material; 27, designates a main coil, 28 designates an auxiliary coil; 29, designates a connection portion at which the common wires of the main coil 27 and the auxiliary coil 28 are connected to each other; and 30, designates a capacitor connected to the main coil 27 and the auxiliary coil 28 (see FIG. 9).

Figure 8:
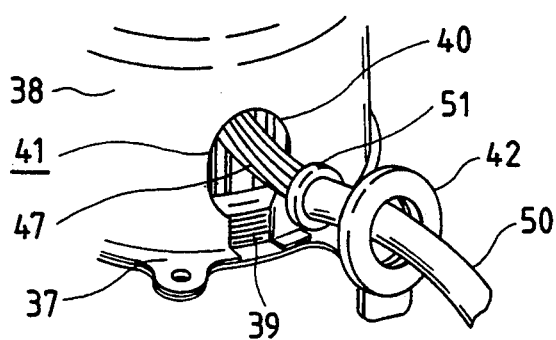
FIG. 8 is a partial perspective view of the bracket shown in FIG. 2.

The reference numeral 33 designates an E-type locking ring which is fitted to the rotational shaft 18; 34, designates a washer which is fitted to the rotational shaft 18; 35, designates a housing; and 36, designates a frame which constitutes one member of the housing 35, and which is provided with a shaft hole (not shown) at the center and a joining edge portion 37 at the periphery edge. The reference numeral 38 designates a bracket which constitutes the other member of the housing 35, and which is provided with a joining edge portion 37 at the periphery edge. A substantially U-shape cut-out portion 41 is formed at a location more inwardly located than the joining edge portion 37. As shown in FIG. 8, the cut-out portion 41 has a narrow entrance 39 and a wide inner portion 40. The reference numeral 42 designates a cord bush which is made of, for example, a synthetic resin and has the same shape as the cut-out portion 41 so as to be fitted therein and fixed at the entrance 39.

The reference numeral 43 designates a disk-like wiring board which is made of, for example, an injection-molded insulating resin and mounted on the insulating cover 19. An opening 60 through which the rotational shaft 18 can pass is formed at the center of the body 43b of the wiring board 43. A recess is formed between the opening 60 and a side wall 43a of the wiring board 43. A pin hole 61 through which the pin body 25 can pass is formed in this recess. In this embodiment, the size of the pin hole 61 is selected so that also the forward end portions of the inner poles 23 and outer poles 24 can pass through the pin hole 61. A pin connecting portion 62 is formed in the vicinity of the pin hole 61.

A cut-out portion 63 which functions as a lead introducing port 44 is formed in the side wall 43a of the wiring board 43. A groove 46 for guiding a power supply lead 47 is vertically formed between the pin connecting portion 62 and the lead introducing port 44. A wall portion 65 for guiding the power supply lead 47 is formed at a portion which opposes the lead introducing port 44, and a projection 64 is formed on its wall so that the inserted power supply leads 47 contact with it, thereby enabling the leads to be easily separated.

Figure 10:
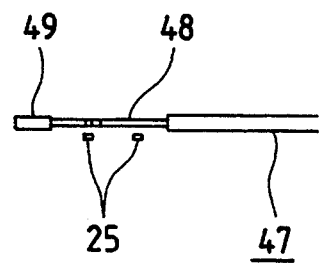
FIG. 10 is a plan view showing the power supply lead and the pin body shown in FIG. 2.

The wiring board 43 is fixed by inserting the inner poles 23 and outer poles 24 disposed on the insulating cover 19 into the pin hole 61. As a result, the groove 46 and the pin body 25 have a mutual positional relationship that they are substantially parallel to each other. The reference numeral 47 designates the power supply leads having a forward end which is to be connected with the pin body 25 and in which the covering is partially stripped off as shown in FIG. 10 or which consists of a covering-stripped portion 48 and a cover-remaining portion 49. The reference numeral 50 designates an insulating tube which is made of a flexible insulating material and through which the power supply leads 47 pass. As shown in FIG. 8, the end of the insulating tube 50 which is to be located inside the bracket 38 is formed as a curled portion 51 which is greater than the cut-out portion 41, so as to constitute a mechanism for preventing the tube from slipping from the bracket 38.

Figure 11:
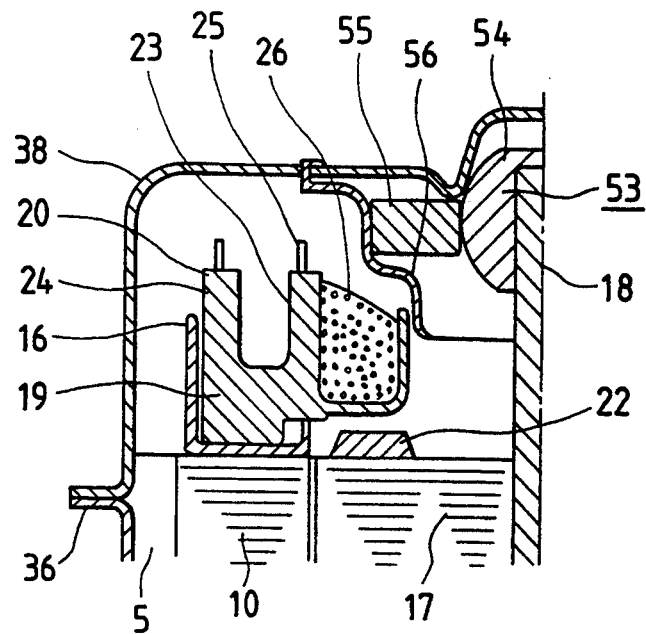
FIG. 11 is a sectional view showing a portion of FIG. 2.

The reference numeral 52 designates bolts for joining the frame 36 to the bracket 38 at the joining edge portion 37. The reference numeral 53 designates a rotational shaft-supporting member consisting of a bearing metal 54 which is disposed at the bottom of the bracket 38 and made of a sintered alloy, an oil-impregnated felt 55 which is disposed around the bearing metal 54, and a bearing cover 56 which covers the bearing metal 54 and the felt 55. As shown in FIG. 11, when the electric motor is assembled, a portion of the rotational shaft-supporting member 53 is located at a position inner than the bobbin columns 20 so that the overall length of the electric motor can be reduced. The reference numeral 66 designates a thermal fuse.

The thus configured electric motor can be assembled as follows. The rotational shaft 18 having the rotor 17 is housed in the inner ring magnetic pole portion 10 in which the insulating portion 11, the first rotational shaft through hole 15, the coil guards 16, etc. are disposed. Then, the insulating cover 19 in which the bobbin columns 20 having the pin bodies 25 are disposed is attached to the inner ring magnetic pole portion 10 while the rotational shaft 18 passes through the insulating cover 19, thereby insulating the end ring 22. By a multiaxis flyer-type winding machine (not shown), conductors for the coils 26 are connected to predetermined pin bodies 25, and wound between the slots 8 so as to encircle inside the inner poles 23 of the bobbin columns 20. The winding end portions of the coils are twined around other predetermined pin bodies 25, thereby automatically performing the winding and termination processes without requiring man power.

Figure 6:
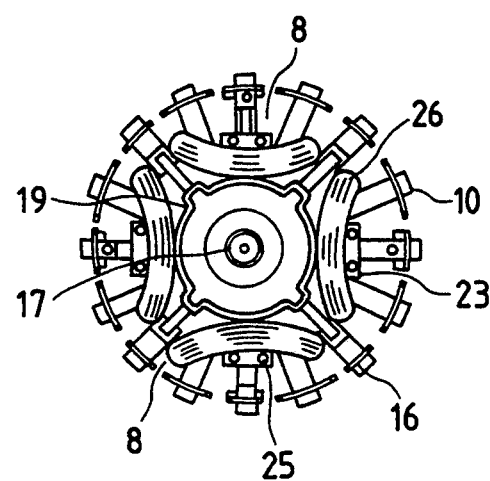
FIG. 6 is a plan view of the stator in which the inner coils shown in FIG. 1 are wound.
Figure 7:
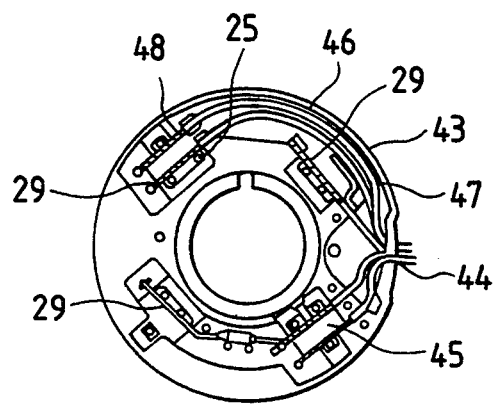
FIG. 7 is a plan view of the wiring board to which the power supply lead shown in FIG. 2 is connected.
Figure 9:
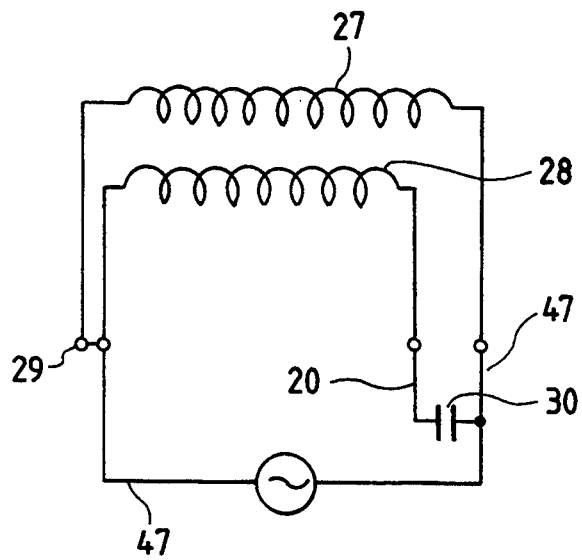
FIG. 9 is a circuit diagram of the motor of FIG. 1.

In this case, as shown in FIG. 6, since the inner portion of the coils 26 is wound inside the inner poles 23, the outer portion of the coils 26 can be wound in a similar manner without occupying up the space for accommodating coils. The soldering is conducted on the pin bodies 25 around which the terminals of the coils have been twined, so that the pin bodies 25 are electrically connected to the coils 26. Probes for electrical tests (not shown) are contacted to the pin bodies 25, and electrical tests are automatically performed.

Thereafter, the inner ring magnetic pole portion 10 is pressingly inserted into a predetermined position of the outer ring yoke portion 5. Insulating wedges 31 which are formed by cutting an insulating film are inserted via the insulating wedge-insertion guides 16d into the outer ring yoke portion 5 and the grooves 16c of the coil guards 16 which are formed at the forward end of the magnetic pole pieces 7, and fixed by the insulating wedge-fixing portions 16f. Then, a predetermined voltage is applied to predetermined pin bodies 25 to energize the coils 26. The heat generated in the coils 26 by this energization causes the autohesion varnish adhering to the surface of the magnet wire to melt, thereby hardening the coils 26.

Then, the thus formed stator is pressingly inserted into the frame 36, and the wiring board 43 which is made of an injection-molded insulating resin is attached to a fixing position of the bobbin columns 20. The power supply leads 47 which have been cut into a predetermined length and the covering of which has been stripped off are disposed in the grooves 46 of the wiring board 43 in such a manner that the covering-stripped portion 48 is located in proximity to the respective pin body 25 of the inner ring magnetic pole portion 10, and they are connected to each other by electric resistance welding or the like. In this case, when the common portions of the coils 26 are respectively twined around the opposing pin bodies 25 of each of the inner poles 23, the common portions can be electrically connected by connecting these pin bodies 25 to the same covering-stripped portion 48 of each of the power supply leads 47. Namely, the pin bodies 25 can be connected to the identical conductor of the power supply lead 47. A plurality of power supply leads 47 go out from the lead introducing port 44 of the wiring board 43, while being pressingly fixed to the wall portion 65 having the cut-out portion 63 and the projection 64.

The exposed conductor portions such as the covering-stripped portion 48 of the power supply leads 47 and the pin bodies 25 are insulated by pouring an ultraviolet-curing insulating resin (not shown) into the recess of the wiring board 43, and then illuminating the resin with ultraviolet rays to instantaneously cure the resin. At the same time, the wiring board 43 and the bobbin columns 20 are jointed and fixed. Then, the bracket 38 having the U-shape cut-out portion 41 is attached to the stator, and fixedly assembled with the frame 36 by fastening the bolts 52.

Thereafter, the curled portion 51 is formed at the forward end of the insulating tube 50 as shown in FIG. 8, and the cord bush 42 made of an insulating resin is slidingly moved from the opposite end to the forward end. The insulating tube 50 is pressingly inserted until the curled portion 51 moves to the inside of the bracket 38, and the cord bush 42 is fittingly fixed to the cut-out portion 41 of the bracket 38. Accordingly, the power supply lead 47 is protected and the cut-out portion 41 of the bracket 38 is closed so that the electric motor is tightly sealed.

As described above, the provision of only the insulating cover 19 causes the pin bodies 25 to be inserted to the bobbin columns 20. Therefore, the insertion of pins can be easily conducted by an automatic machine, and the yield of the process of inserting pins can be improved. Even when the core thickness of the stator is changed, the components can be commonly used. Furthermore, since the covering-stripped portion of the power supply leads 47 is jointed to a plurality of pin bodies 25 around which the terminals of the coils 26 are twined, the connection of the con, non portions of the coils 26 can be easily achieved.

In the above described embodiment, the coil guards 16 are provided with the grooves 16c, the insulating wedge-insertion guides 16d and the like which cooperate to function as inserting portions for the insulating wedges 31. Alternatively, these inserting portions may be formed in the outer ring yoke portion 5. This embodiment can attain the same effects as the above described embodiment.

FIGS. 19 to 27 show another embodiment of the invention. In this embodiment, the configurations except those shown in FIGS. 19 to 27 are the same as those shown in FIGS. 1 to 3, 15, 16 and 18.

In FIGS. 1 to 3, 15, 16, 18, 20 and 26, 5 designates an outer ring yoke portion which constitutes the outer ring portion of a stator core 6. The outer ring yoke portion 5 is formed as follows: an electric steel sheet wound in a hoop is punched by a high speed automatic press (not shown) in the shapes of a stator and a rotor core which will be described later. The reference numeral 6a designates fitting recesses which are formed on the inner wall of the outer ring yoke portion so that the opposing side walls in each of the recesses are on the center line of an inner ring magnetic pole portion which will be described later. The reference numeral 7 designates a plurality of magnetic pole pieces which protrude so as to form slots 8 directed from the inner periphery of the outer ring yoke portion 5 toward the center. The forward ends 7a of the magnetic pole pieces are respectively fitted in the fitting recesses 6a of the outer ring yoke portion 5.

The magnetic pole pieces 7 are arranged at equal intervals, and connected through slots 8 with an insulating portion which will be described later, thereby constituting an inner ring magnetic pole portion 10. The reference numeral 11 designates an insulating portion which is produced by, for example, injection molding so as to cover the inner ring magnetic pole portion 10. The insulating portion 11 is formed on and fixed to the slots 8 and the end face 12 of the inner ring magnetic pole portion 10, so as to cover also the forward ends 7a of the magnetic pole pieces 7 which have a portion to be fitted with the outer ring yoke portion 5 as illustrated.

The reference numeral 13 designates insulating resin which is formed on and fixed to one end face 14 of the inner ring magnetic pole portion 10. The insulating resin is formed integrally with the insulating portion 11 into a funnel-like shape, and has at its forward end a first circular through hole 15 for a rotational shaft.

The reference numeral 16 designates coil guards which protrude from the peripheral edge of the inner ring magnetic pole portion 10 and are formed integrally with the rotational shaft through hole 15 to function as winding guides. The reference numeral 17 designates a rotor which is disposed in the inner ring magnetic pole portion 10 and through which a rotational shaft 18 passes at the center portion. The reference numeral 19 designates an insulating cover which has a funnel-like shape. A plurality of bobbin columns 20 which independently function as winding guides are formed in the periphery of the insulating cover. The insulating cover 19 has a second circular through hole 21 for the rotational shaft which hole is communicated with the inner ring magnetic pole portion 10 and the first through hole 15 for the rotational shaft. The insulating cover 19 is detachably attached to the end face of the inner ring magnetic pole portion 10 so that an end ring 22 which is a conductor of the rotor 17 is insulated from the exterior.

The bobbin columns 20 are arranged at positions quartering the inner ring magnetic pole portion 10. The bobbin columns 20 consist of inner poles 23 which are located in the center side of the inner ring magnetic pole portion 10, and outer poles 24 which are located outside the inner ring magnetic pole portion 10 so as to respectively oppose the inner poles. The bobbin columns 20 are arranged within the inner diameter of the inner ring magnetic pole portion 10 in such a manner that they are closer to the center of the inner ring magnetic pole portion 10 than the coil guards 16. The inner poles 23 are disposed so as to be closer to the center of the inner ring magnetic pole portion 10 than the coil guards 16 which are formed integrally with the inner ring magnetic pole portion 10.

The reference numeral 25 designates pins which are inserted into the forward end of the bobbin columns 20. A plurality of pins are attached at a predetermined space to the inner poles 23. To the pins, connected are end portions of coils and power supply leads which will be described later. The reference numeral 26 designates the coils which are the main portions of the stator 3 and consist of a magnet wire coated with, for example, an autohesion material. The reference numeral 31 designates insulating wedges. Although the illustration is omitted, a thermal fuse is disposed in the same manner as FIG. 16 on a terminal holder which will be described later. The reference numeral 35 designates a housing, and 36 designates a frame which constitutes one member of the housing 35, and which is provided with a shaft hole (not shown) at the center and a joining edge portion 37 at the periphery edge. The reference numeral 38 designates a bracket which constitutes the other member of the housing 35, and which is provided with a joining edge portion 37 at the periphery edge.

Figure 23:
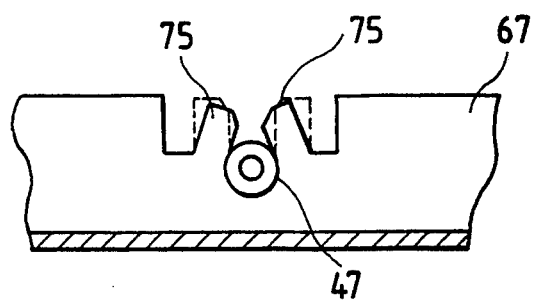
FIG. 23 is a side elevation view of the main portion of FIG. 21 and shows a deformed state of projections of the guiding groove of FIG. 21.
Figure 24:
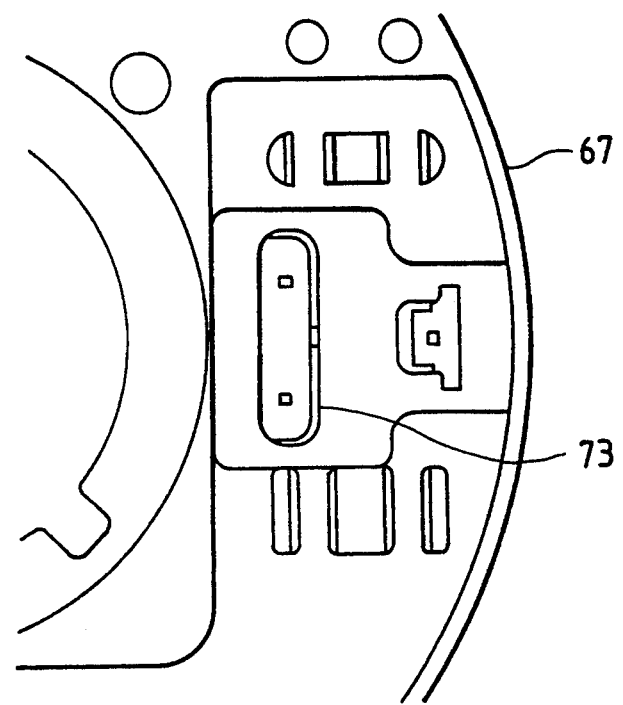
FIG. 24 is a partial plan view showing the assembly of the terminal holder and a bobbin column.
Figure 25:
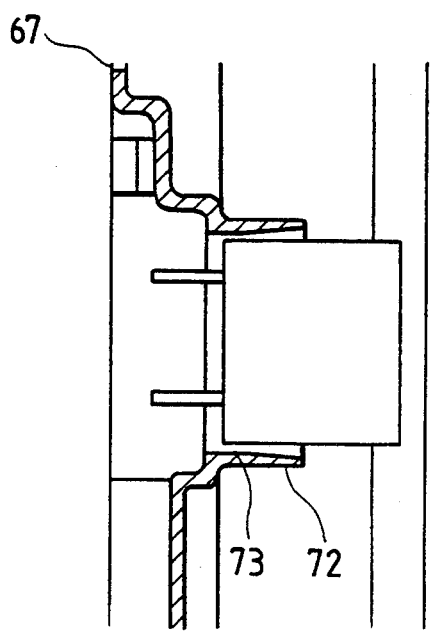
FIG. 25 is a side elevation view of the main portion of FIG. 24.
Figure 26:
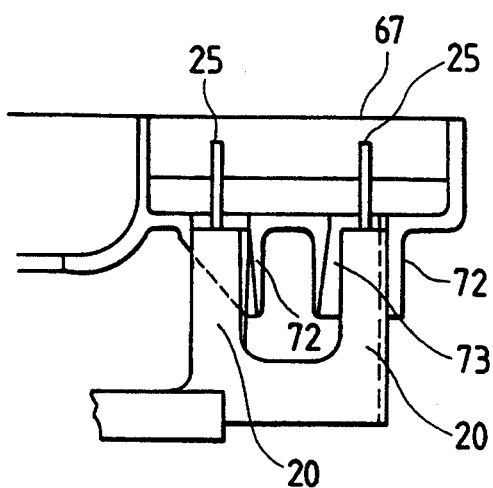
FIG. 26 is a bottom view of the main portion of FIG. 24.

In FIGS. 19 to 27, 67 designates a disk-like terminal holder which is made of, for example, an injection-molded insulating resin and which has an opening 70 at the center portion. Pin holes 71 through which the bobbin columns 20 pass are formed at positions quartering the body of the terminal holder 67. The reference numeral 72 designates cylindrical guards which protrude from the back of the pin holes 71 to prevent putty from leaking. The reference numeral 73 designates a gap portion which, when the bobbin columns 20 are inserted into the pin holes 71, functions as a wiring path for guiding the terminals of the coils 26 that are the main portions of the stator 3. The reference numeral 74 designates lead guide grooves which protrude on the terminal holder 67 to oppose the pin holes 71 and into which power supply leads described later are inserted to be guided to the inner poles 23. The reference numeral 75 designates projections which protrude from and are formed around the guide grooves 74 so as to sandwich or form the guide grooves 74. The projections 75 are deformable as shown in FIG. 23 to nippingly fix the power supply leads. The reference numeral 76 designates grooves which run in parallel with the guide grooves 74 and guide the power supply leads to the inner poles 23. The reference numeral 77 designates putty blocking pins which protrude in grooves 76 in the side of the pins 25 and in which, for example, the base portion is made thin so that the pins can be easily removed.

Figure 27:
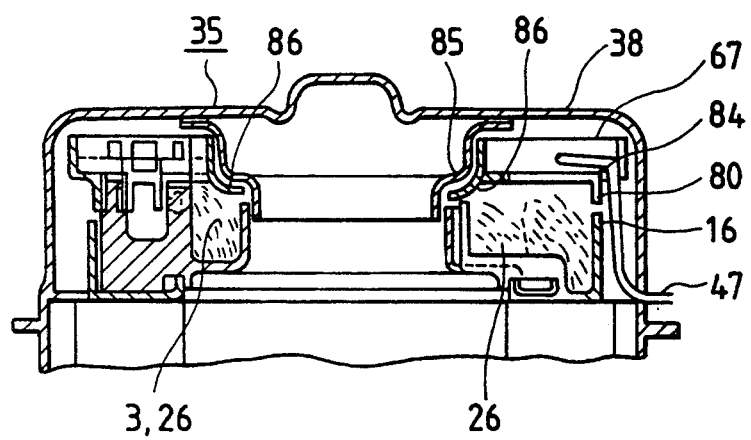
FIG. 27 is a sectional view showing the vicinity of the terminal holder.
Figure 28:
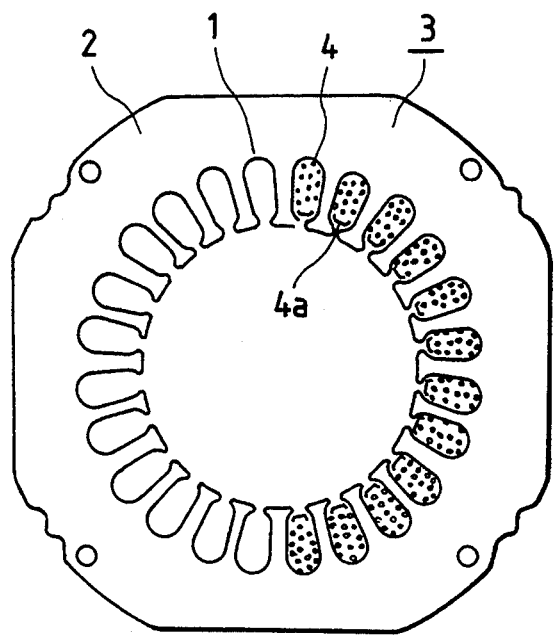
FIG. 28 is a plan view showing a stator of a conventional motor.
Figure 29:
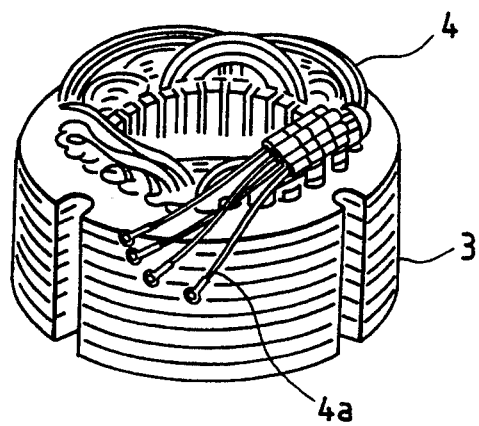
FIG. 29 is a perspective view of the stator of FIG. 28.
Figure 30:
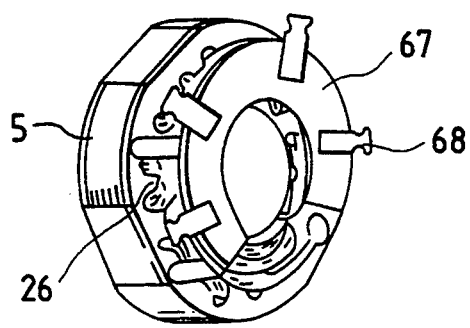
FIG. 30 is a perspective view showing an outer ring yoke portion of another conventional motor.
Figure 31:
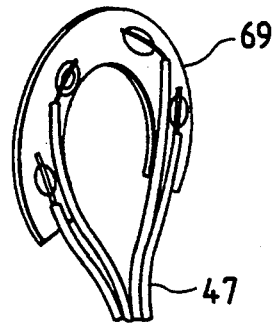
FIG. 31 is a perspective view showing a terminal cover of the motor of FIG. 30.

The reference numeral 78 designates a lead introducing port which is a hole formed in the surface 79 of the terminal holder 67, 80 designates a skirt portion which protrudes from the long side 81 of the lead introducing port 78 toward the back face, and 82 designates a lead guard portion which ensures the insertion width for the power supply leads and is formed by cutting out the side wall 83 of the terminal holder 67 so as to oppose the lead introducing port 78. The reference numeral 84 designates a projection which prevents the leads from slipping off and is formed at the center of the long side 81, and 85 designates a metal vat attached to the inner wall of the bracket 38. The reference numeral 86 designates a protruding piece which surrounds the opening 70 of the terminal holder 67 so that the front end opposes the end of an insulating cover as shown in FIG. 27. The protruding piece 86 covers the coils 26 to electrically isolate them from the metal vat 85.

The reference numeral 47 designates the power supply leads having a forward end which is to be connected with the pin body 25, and in which the covering is partially stripped off or which consists of a covering-stripped portion and a cover-remaining portion.

The thus configured electric motor can be assembled as follows. The rotor 17 is housed by inserting the rotational shaft 18 into the inner ring magnetic pole portion 10 in which the insulating portion 11, the first rotational shaft through hole 15, the coil guards 16, etc. are disposed. Then, the insulating cover 19 in which the bobbin columns 20 having the pin bodies 25 are disposed is attached to the inner ring magnetic pole portion 10 while the rotational shaft 18 passes through the insulating cover 19, thereby insulating the end ring 22.

By a multiaxis flyer-type winding machine (not shown), the terminals of the coils 26 are twined around predetermined pin bodies 25 to be connected thereto, and conductors for the coils are wound between the slots 8 so as to encircle inside the inner poles 23 of the bobbin columns 20. The winding end portions of the coils are twined around other predetermined pin 25, thereby automatically performing the winding and termination processes without requiring man power. Then, the soldering is conducted on the pin 25 around which the coils have been twined, so that the pin 25 are electrically connected to the coils 26. Probes for electrical tests (not shown) are contacted to the pin 25, and electrical tests are automatically performed.

Thereafter, the inner ring magnetic pole portion 10 is pressingly inserted into a predetermined position of the outer ring yoke portion 5. Insulating wedges 31 which are formed by cutting an insulating film are inserted between the outer ring yoke portion 5 and the coil guards 16 which are formed at the forward end of the magnetic pole pieces 7 of inner ring magnetic pole portion 10. Then, a predetermined voltage is applied to a predetermined position of the pin 25 to energize the coils 26. The heat generated in the coils 26 by this energization causes the autohesion varnish adhering to the surface of the magnet wire to melt, thereby hardening the coils 26.

After the thus formed stator is pressingly inserted into the frame 36, the wiring board 67 which is made of an injection-molded insulating resin is attached to a fixing position of the bobbin columns 20. The leads of the thermal fuse are cut in a predetermined length and shaped, and then placed to predetermined positions of the wiring board 67 to be connected to the pins 25 by electric resistance welding or the like. Thereafter, the putty blocking pins 77 are removed using a cutting nipper or the like. The putty blocking pins 77 prevent the insulating resin from flowing out when the power supply leads 47 are not placed.

Figure 15:
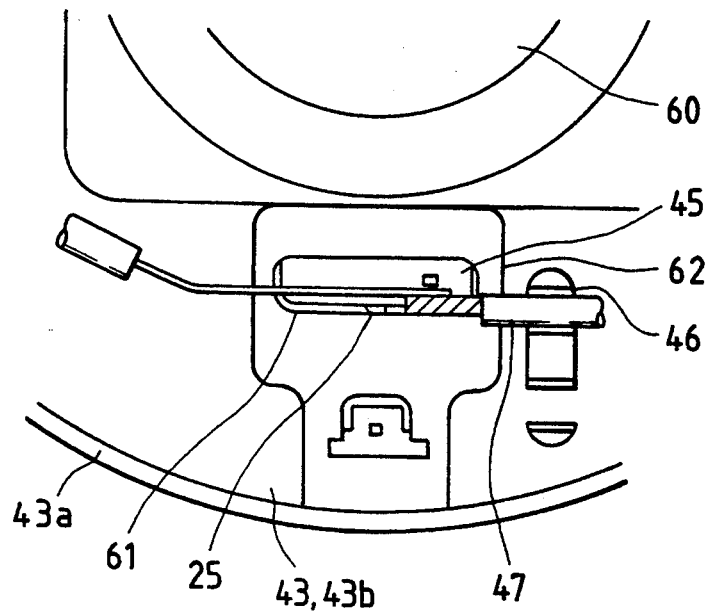
FIG. 15 is a partial plan view showing the connection between the power supply lead and a pin in the wiring board shown in FIG. 2.
Figure 16:
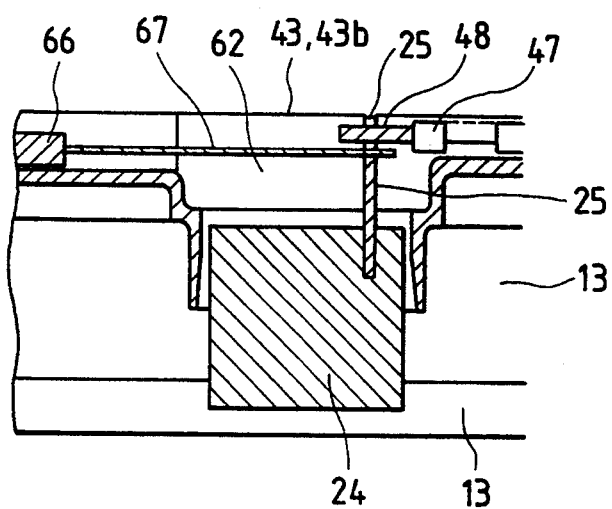
FIG. 16 is a partial sectional view showing the connection between the power supply lead and the pin in FIG. 15.
Figure 17:
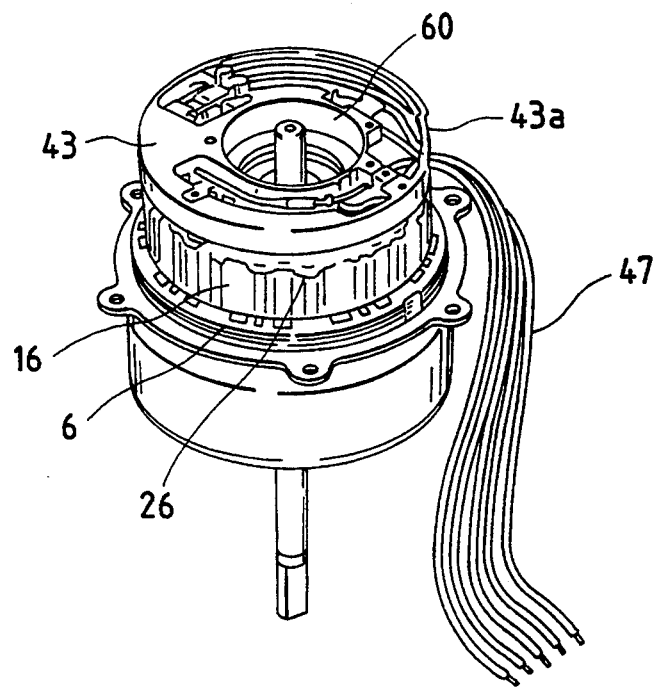
FIG. 17 is an enlarged perspective view of the wiring board shown in FIG. 2.
Figure 18A:
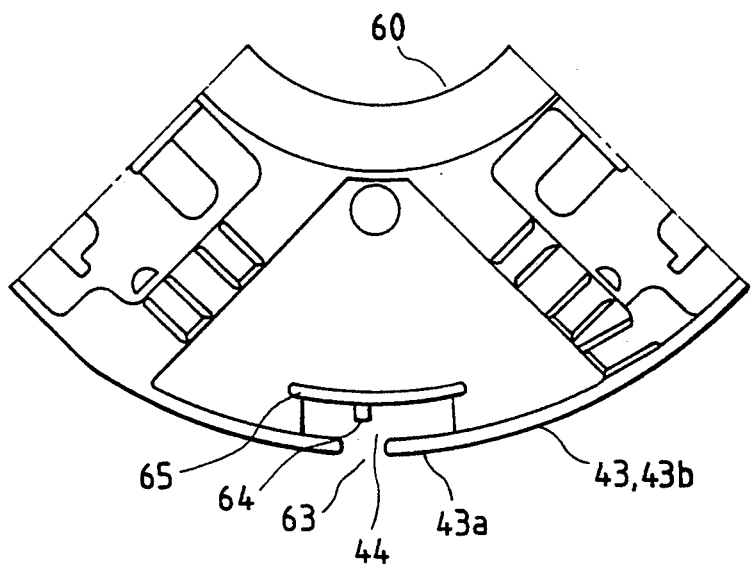
FIGS. 18A and 18B are enlarged views showing the main portion of the wiring board shown in FIG. 17.
Figure 18B:
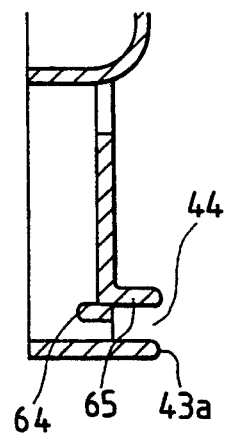
Figure 21:
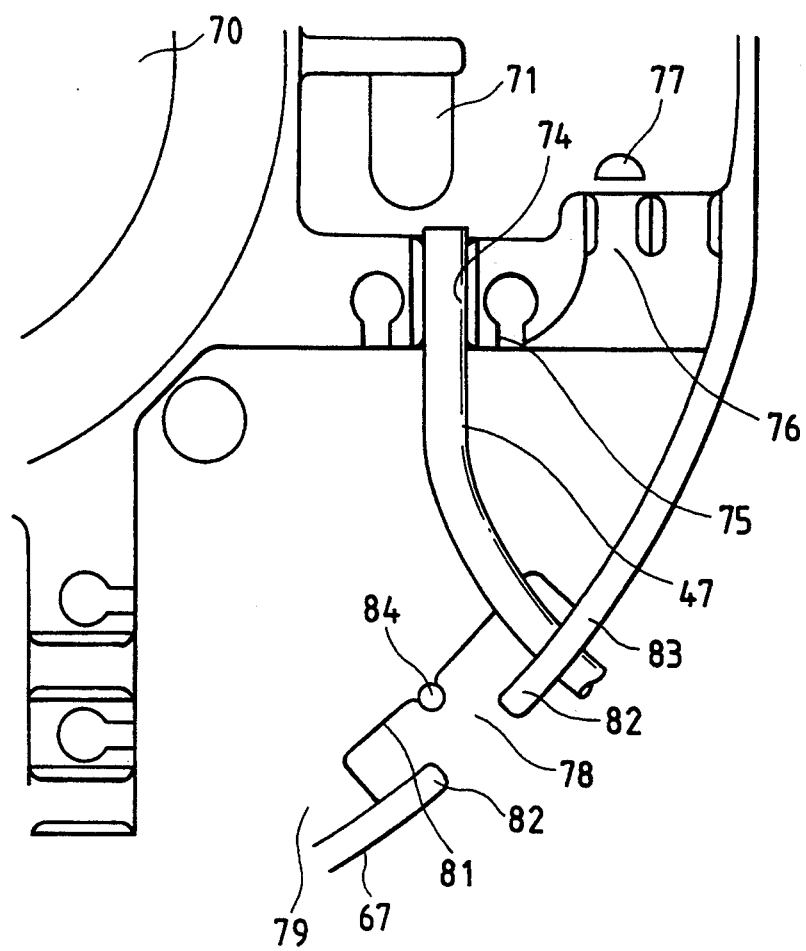
FIG. 21 is a partial plan view showing mainly a guide groove of the terminal holder of FIG. 19.
Figure 22:
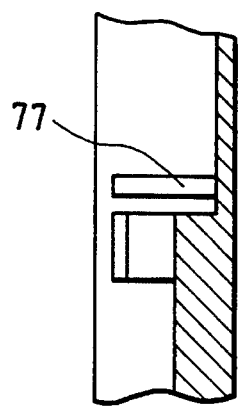
FIG. 22 is a side elevation view of the main portion of FIG. 21.

When the power supply leads 47 are inserted into the lead introducing port 78, the power supply leads 47 are fixed by the combination of the lead guard portion 82 and the projection 84, whereby the power supply leads 47 are prevented from slipping out and bundled. This facilitates the attachment to the bracket 38. Then, the power supply leads 47 are placed in the guide grooves 74, and the projections 75 are deformed using an electric iron so that the power supply leads 47 are fixed. The covering-stripped portions of the power supply lead 47 are contacted with the pins 25 as shown in FIG. 15 and connected therewith by electric resistance welding or the like. The exposed conductor portions such as the covering-stripped portions of the power supply leads 47 and the pin bodies 25 are insulated by pouring an ultraviolet-curing insulating resin (not shown) into the guide grooves 74 of the wiring board 67, and then illuminating the resin with ultraviolet rays to instantaneously cure the resin. At the same time, the wiring board 67 and the bobbin columns 20 are joined and fixed.

Then, the bracket 38 is attached to the stator, and fixedly assembled with the frame 36 by fastening the bolts 52. In this case, as shown in FIG. 27, the skirt portion 80 and the coil guards 16 prevent the power supply leads 47 from contacting with the coils 26, thereby ensuring the insulation. Moreover, the protruding piece 86 prevent the metal vat 85 and the coils 26 from contacting with each other, thereby ensuring the insulation.

In the above described embodiment, the putty blocking pins 77 are removed using a cutting nipper or the like. The putty blocking pins 77 may be removed by an ultrasonic machine. In place of the putty blocking pins 77, a thin film may be formed in the grooves 76 or on the end face of the wiring board 67. These modifications can achieve the same effects as the above described embodiment.

As described above, the electric motor of the invention comprises: an outer ring yoke portion which forms an outer ring; a stator core in which an inner ring magnetic pole portion is fitted in the outer ring yoke portion, the inner ring magnetic pole portion having slots and consisting of a plurality of magnetic pole pieces; an insulating portion which covers the inner ring magnetic pole portion of the stator core; a funnel-shaped insulating resin which is formed integrally with the insulating portion and covers one end face of the inner ring magnetic pole portion, the insulating resin including a first through hole for a rotational shaft, the first through hole being communicated with the center of the inner ring magnetic pole portion; coil guards which are protuberantly formed on the magnetic pole pieces, the coil guards being formed integrally with the insulating resin; a rotor which is inserted into the inner ring magnetic pole portion; a funnel-shaped insulating cover including a second through hole for the rotational shaft, the insulating cover covering the rotor, the second through hole being communicated with the first through hole; bobbin columns having pins which are protuberantly formed on an end face of the insulating cover, the bobbin columns being located between side of the coil guard and the center of the inner ring magnetic pole portion; and coils which are wound in a space formed between the bobbin columns and the center of the inner ring magnetic pole portion, the coils having terminals which are connected to the pins. Accordingly, the end portions of the coils can be disposed in a space above the rotor so that the height of the coil end is reduced and required amount of conductors for coils is reduced to a minimum level. This allows a high-efficient compact electric motor with the reduced material of coils to be automatically manufactured. Furthermore, the process of inserting insulating wedges in the motor can be stably performed, and therefore this process can be automated.

As described above, in the invention, the bobbin columns are located within the inside diameter of the inner ring magnetic pole portion. Therefore, the inner portion of the coils 26 can be wound within the inside the inner diameter of the stator, and does not occupy the slot space for the outer portion of the coils which is to be wound later. Accordingly, it is possible to increase the winding capacity of the outer portion of the coils which is wound in a later step.

As described above, in the invention, supporting members for the rotational shaft are disposed in the insulating resin and the insulating cover. Therefore, the length of the electric motor can be reduced.

As described above, in the invention, a common wire of coils is connected to a plurality of pins, and a wiring board through which the pins pass is mounted on the stator core, the wiring board being provided with grooves for allowing the plurality of pins to be connected to an identical conductor of power supply leads. Accordingly, the connection between the of common wires and the pins can be done by one process, thereby facilitating the connection process.

As described above, in the invention, a covering of a power supply lead is stripped off, and the power supply lead is located in the groove while the forward end of the power supply lead remains covered. Accordingly, the positional relationship between the power supply lead and the pins can be maintained in a proper manner, and therefore the process of electrically joining them using electric resistance welding or the like can be easily performed by an automatic machine.

As described above, in the invention, a housing for accommodating the stator core is constituted by a frame and a bracket which are joined with each other by opposite joining edge portions, the joining edge portion of the bracket having a substantially U-shape cut-out portion through which the power supply leads are inserted, the cut-out portion having a narrow entrance and a wide inner portion, and a code bush is fitted to the cut-out portion. Accordingly, the cord bush and insulating tube which are to be attached later can be easily fixed.

As described above, in the invention, the power supply leads run through an insulating tube, the insulating tube having a curled portion at an end portion thereof, the curled portion having a larger size than that of the cut-out portion. Accordingly, the insulating tube can be easily prevented from slipping out from the bracket.

As described above, in the invention, the coil guards are formed into different shapes, grooves are formed at a side wall of the coil guards, and insulating wedges are inserted. Accordingly, the process of inserting insulating wedges in the electric motor can be stably performed, and therefore this insertion process can be automated.

As described above, in the invention, the coil guards have an inclined guide for an insulating wedge and a protrudent fixing portion for the insulating wedge. Accordingly, the insulating wedge can be easily attached to the electric motor, the workability is improved, and the automating is expedited.

As described above, in the invention, the inner portion of the coils can be wound within the inside the inner diameter of the stator, and does not occupy the slot space for the outer portion of the coils which is to be wound later. Accordingly, it is possible to increase the winding capacity of the outer portion of the coils which is to be wound later. Furthermore, since each of the bobbin columns on the insulating cover is constituted by an inner pole with a plurality of pins and an outer pole with a single pin, the inner pole being located separately from each other on a circle which has the center in the inner ring magnetic pole portion, the bobbin columns and the pins can be disposed in the space formed in the coils Even when the specification of the electric motor defines that many leads shall be connected, accordingly, the terminals of the coils can be twined without occupying up the space for the coils. Furthermore, since the outer poles are located separately from each other on circles of different sizes, an automatic machine for disposing the leads so as to oppose the pins can be simplified in structure.

As described above, in the invention, a plurality of coils which produce different phases are connected to pins, respectively, and a wiring board through which the pins pass is mounted on the stator core, the wiring board being provided with grooves for allowing the plurality of pins to be connected to an identical conductor of power supply leads. Accordingly, the connection between a lead wire and pins can be accomplished by a single process, and a single wire is sufficient for connecting a lead wire with a plurality of pins, whereby the connecting process can be greatly simplified.

As described above, in the invention, a wiring board comprises: a disk-like wiring board body; an opening formed at the center of the wiring board body; pin connecting portions disposed around the opening and at positions quartering the wiring board body, the pin connecting portions having a plurality of pin hole rows; lead connecting portions which are perpendicular to the pin connecting portions; and a lead introducing port disposed between the pin connecting portions, the wiring board further comprising a cut-out portion formed by cutting the side wall of the wiring board in the lead introducing port, and a wall portion elongating along the cut-out portion. Accordingly, the power supply leads can be pressed by the cut-out portion and the wall portion to be fixed, thereby preventing the power supply leads from slipping off, separating and being unbraided.

As described above, in the invention, the electric motor comprises: an outer ring yoke portion which forms an outer ring; a stator core in which an inner ring magnetic pole portion is fitted in the outer ring yoke portion, the inner ring magnetic pole portion having slots and consisting of a plurality of magnetic pole pieces; an insulating portion which covers the inner ring magnetic pole portion of the stator core; a funnel-shaped insulating resin which is formed integrally with the insulating portion and covers one end face of the inner ring magnetic pole portion, the insulating resin including a first through hole for a rotational shaft having continuity with the center of the inner ring magnetic pole portion; bobbin columns having pins which are protuberantly formed on the magnetic pole pieces, the bobbin columns being formed integrally with the insulating resin; a stator in which a funnel-shaped insulating cover including a second through hole for the rotational shaft is disposed on the other end face of the inner ring magnetic pole portion, and coils are wounded between the slots, terminals of the coils being twined around the pins, the second through being communicated with the first through hole when the rotor is located in the inner ring magnetic pole portion; a terminal holder having an opening at the center, the terminal holder being provided with electronic devices to be connected to the pins of the bobbin columns; guide grooves for guiding leads to pin holes which are formed at positions quartering the terminal holder; and deformable protruding portions provided for sandwiching the guide grooves. Accordingly, the power supply lead can be surely sandwiched by the protruding portions to be fixed, thereby preventing the power supply lead from lifting and slipping off.

As described above, in the invention, detachable putty blocking pins are disposed in the guide grooves defined in claim 13. Accordingly, the terminal holder can be commonly used and manufactured at a lower cost.

As described above, in the invention, cylindrical guards are disposed on the back face of the pin holes defined in claim 14. Accordingly, putty is prevented from leaking from the pin holes, with the result of the improved quality.

As described above, in the invention, a protruding piece which opposes the insulating cover is disposed around the opening defined in claim 15. Accordingly, the coils can be easily insulated.

As described above, in the invention, a lead introducing port is formed in the periphery of the terminal holder defined in claim 16, and a downward skirt portion is continuously formed from the lead introducing port. Accordingly, the leads are prevented from contacting with the coils, so that the coils are insulated.

What is claimed is:

1. An electric motor comprising:
   an outer ring yoke portion forming an outer ring;
   a stator core in which an inner ring magnetic pole portion is fitted in said outer ring yoke portion, said inner ring magnetic pole portion including slots and a plurality of magnetic pole pieces;
   an insulating portion covering said inner ring magnetic pole portion of said stator core;
   a funnel-shaped insulating resin formed integrally with said insulating portion and covering said inner ring magnetic pole portion of said stator core;
   a funnel-shaped insulating resin formed integrally with said insulating portion and covering one end face of said inner ring magnetic pole portion, said funnel-shaped insulating resin including a first through hole for a rotational shaft, said first through hole communicating with a center of said inner ring magnetic pole portion;
   coil guards protuberantly formed on said plurality of magnetic pole pieces, said coil guards formed integrally with said funnel-shaped insulating resin;
   a rotor inserted into said inner ring magnetic pole portion;
   a funnel-shaped insulating cover including a second through hole for said rotational shaft, said funnel-shaped insulating cover covering said rotor, said second through hole communicating with said first through hole;
   bobbin columns having pins protuberantly formed on an end face of said funnel-shaped insulting cover, said bobbin columns located between a side of said coil guards and the center of said inner ring magnetic pole portion; and
   coils wound in a space formed between said bobbin columns and the center of said inner ring magnetic pole portion, said coils having terminals connected to said pins.

2. The electric motor of claim 1, wherein said bobbin columns are located within an inside diameter of said inner ring magnetic pole portion.

3. The electric motor of claim 1, wherein supporting members for said rotational shaft are disposed in said funnel-shaped insulating resin and said funnel-shaped insulating cover.

4. The electric motor of claim 1, wherein a common wire of coils is connected to a plurality of pins, and a wiring board through which said plurality of pins pass is mounted on said stator core, said wiring board provided with grooves for connecting said plurality of pins to an identical conductor of power supply leads.

5. The electric motor of claim 4, wherein a covering of said power supply lead is stripped off and said power supply leads are located in said grooves while a forward end of said power supply leads remains covered.

6. The electric motor of claim 1, wherein a housing for accommodating said stator core includes a frame and a bracket joined together by opposite joining edge portions, a joining edge portion of said bracket having a substantially U-shaped cut-out portion through which said power supply leads are inserted, said cut-out portion having a narrow entrance and a wide inner portion, and a code bush fitted to said cut-out portion.

7. The electric motor of claim 6, wherein said power supply leads run through an insulating tube, said insulating tube having a curled portion at an end portion thereof, wherein said curled portion is larger than said cut-out portion.

8. The electric motor of claim 1, wherein said coil guards are formed into different shapes, grooves are formed at a side wall of said coil guards, and insulating wedges are inserted in said grooves.

9. The electric motor of claim 1, wherein said coil guards have an inclined guide for an insulating wedge and a protrudent fixing portion for the insulating wedge.

10. The electric motor of claim 1, wherein each of said bobbin columns on said funnel-shaped insulating cover includes an inner pole with a plurality of pins and an outer pole with a single pin, each of said inner poles located separate from each other on a circle having a center in said inner ring magnetic pole portion, each of said outer poles located separate from each other on a concentrical circle greater than said circle.

11. The electric motor of claim 1, wherein a plurality of coils for producing different phases are connected to a plurality of pins, respectively, and a wiring board through which said plurality of pins pass is mounted on said stator core, said wiring board provided with grooves for connecting said plurality of pins to an identical conductor of power supply leads.

12. The electric motor of claim 1, further comprising a wiring board including:
   a disk-like wiring board body;
   an opening formed at a center of said wiring board body;
   pin connecting portions disposed around said opening and at positions quartering said wiring board body, said pin connecting portions having a plurality of pin hole rows;
   lead connecting portions perpendicular to said pin connecting portions;
   a lead introducing port disposed between said pin connecting portions, said wiring board further comprising a cut-out portion formed by cutting a side wall of said wiring board in said lead introducing port, and a wall portion elongating along said cut-out portion.

13. An electric motor comprising:

an outer ring yoke portion forming an outer ring;

a stator core in which an inner ring magnetic pole portion is fitted in said outer ring yoke portion, said inner ring magnetic pole portion including slots and a plurality of magnetic pole pieces;

an insulating portion covering said inner ring pole portion of said stator core;

a funnel-shaped insulating resin formed integrally with said insulating portion and covering one end face of said inner ring magnetic pole portion, said insulating resin including a first through hole for a rotational shaft having continuity with a center of said inner ring magnetic pole portion;

bobbin columns having pins protuberantly formed on said plurality of magnetic pole pieces, said bobbin columns being formed integrally with said funnel-shaped insulating resin;

a stator in which a funnel-shaped insulating cover including a second through-hole for said rotational shaft is disposed on another end face of said inner ring magnetic pole position, wherein coils are wound between a plurality of slots and terminals of said coils are twined around a plurality of pins, said second through hole communicating with said first through hole when said rotor is located in said inner ring magnetic pole portion;

a terminal holder having an opening at a center thereof, said terminal holder provided with electronic devices connected to said plurality of pins of said bobbin columns;

guide grooves for guiding leads to pin holes formed at positions quartering said terminal holder; and deformable protruding portions provided for sandwiching said guide grooves.

14. The electric motor of claim 13, wherein detachable putty blocking pins are disposed in said guide grooves.

15. The electric motor of claim 14, wherein cylindrical guards are disposed on a back face of said pin holes.

16. The electric motor of claim 15, wherein a protruding piece opposing said funnel-shaped insulating cover is disposed around said opening.

17. The electric motor of claim 16, wherein a lead introducing port is formed in a periphery of said terminal holder, and a downward skirt portion is continuously formed from said lead introducing port.

18. An electric motor comprising:

a rotor, including a rotational shaft at a center of said rotor;

a plurality of magnetic pole pieces radially arranged to accommodate said rotor;

a plurality of slots, formed between said plurality of magnetic pole pieces, to accommodate a plurality of coils;

an outer ring yoke portion, including a plurality of recess portions, for fixing a position of said plurality of magnetic pole pieces;

an insulating cover for covering an outer side of said rotor and including a cylindrical through-hole through which said rotational shaft is inserted; and bobbin columns, located on an outer side of said insulating cover, for positioning said plurality of coils extended from said plurality of slots.

* * * * *